US007898259B2

(12) United States Patent
Hall et al.

(10) Patent No.: US 7,898,259 B2
(45) Date of Patent: Mar. 1, 2011

(54) DOWNHOLE INDUCTION RESISTIVITY TOOL

(75) Inventors: David R. Hall, Provo, UT (US); Paula Turner, Pleasant Grove, UT (US); Harold Snyder, Rockwall, TX (US); Clint Cook, Provo, UT (US); Katie George, Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 12/341,771

(22) Filed: Dec. 22, 2008

(65) Prior Publication Data

US 2009/0160445 A1 Jun. 25, 2009

Related U.S. Application Data

(63) Continuation-in-part of application No. 11/776,447, filed on Jul. 11, 2007, and a continuation-in-part of application No. 11/676,494, filed on Feb. 19, 2007, now Pat. No. 7,265,649, and a continuation-in-part of application No. 11/687,891, filed on Mar. 19, 2007, now Pat. No. 7,301,429.

(60) Provisional application No. 60/914,619, filed on Apr. 27, 2007, provisional application No. 61/073,190, filed on Jun. 17, 2008.

(51) Int. Cl.
*G01V 3/18* (2006.01)
*G01V 3/28* (2006.01)

(52) U.S. Cl. .................. 324/339; 324/333; 324/345

(58) Field of Classification Search .......... 324/338–341, 324/345–346, 349, 356, 369, 333
See application file for complete search history.

(56) References Cited

U.S. PATENT DOCUMENTS

| 4,278,556 A | 7/1981 | Tada |
| 4,302,722 A | 11/1981 | Gianzero |
| 4,536,714 A | 8/1985 | Clark |
| 4,563,714 A | 1/1986 | Takeuchi |
| 4,766,384 A | 8/1988 | Kleinberg et al. |
| 4,785,247 A | 11/1988 | Meador et al. |
| 4,808,929 A | 2/1989 | Oldigs |
| 4,839,644 A | 6/1989 | Safinya et al. |
| 4,881,988 A | 11/1989 | Bonser |
| 4,933,640 A | 6/1990 | Kuckes |
| 4,980,643 A | 12/1990 | Gianzero et al. |
| 5,045,795 A | 9/1991 | Gianzero et al. |
| 5,081,419 A | 1/1992 | Meador et al. |
| 5,089,779 A | 2/1992 | Roden |
| 5,095,272 A | 3/1992 | Sinclair |
| 5,138,263 A | 8/1992 | Towle |
| 5,428,293 A | 6/1995 | Sinclair et al. |
| 5,442,294 A | 8/1995 | Rorden |
| 5,448,227 A | 9/1995 | Orban et al. |
| 5,491,488 A | 2/1996 | Wu |

(Continued)

*Primary Examiner* — Reena Aurora
(74) *Attorney, Agent, or Firm* — Holme Roberts & Owen LLP

(57) ABSTRACT

A downhole induction resistivity assembly that comprises a downhole tool string component. The tool string component comprises an induction transmitter. The transmitter is adapted to induce an induction field in the surrounding formation. A first induction receiver is spaced apart from the transmitter and is adapted to measure the induction field. A magnetic field generating mechanism is disposed adjacent on either or both sides of the transmitter and adapted to guide the transmitter's signal into the formation. A second induction receiver is disposed in close proximity to the magnetic field generating mechanism and is adapted to measure the magnetic field generated by the mechanism.

22 Claims, 14 Drawing Sheets

U.S. PATENT DOCUMENTS

| | | | |
|---|---|---|---|
| 5,530,358 | A | 6/1996 | Wisler |
| 5,594,343 | A | 1/1997 | Clark et al. |
| 5,606,260 | A | 2/1997 | Giordano et al. |
| 5,668,475 | A | 9/1997 | Orban et al. |
| 5,905,379 | A | 5/1999 | Orban et al. |
| 6,068,394 | A | 5/2000 | Dublin |
| 6,100,696 | A | 8/2000 | Sinclair |
| 6,114,972 | A | 9/2000 | Smith |
| 6,163,155 | A | 12/2000 | Bittar |
| 6,191,586 | B1 | 2/2001 | Bittar |
| 6,218,842 | B1 | 4/2001 | Bittar et al. |
| 6,259,030 | B1 | 7/2001 | Tanigawa et al. |
| 6,285,014 | B1 | 9/2001 | Beck |
| 6,297,639 | B1 | 10/2001 | Clark |
| 6,344,746 | B1 | 2/2002 | Chunduru et al. |
| 6,359,438 | B1 | 3/2002 | Bittar |
| 6,476,609 | B1 | 11/2002 | Bittar |
| 6,538,447 | B2 | 3/2003 | Bittar |
| 6,577,129 | B1 | 6/2003 | Thompson et al. |
| 6,586,939 | B1 | 7/2003 | Fanini et al. |
| 6,630,831 | B2 | 10/2003 | Amini |
| 6,641,434 | B2 | 11/2003 | Boyle et al. |
| 6,646,441 | B2 | 11/2003 | Thompson et al. |
| 6,667,620 | B2 | 12/2003 | Homan |
| 6,670,880 | B1 | 12/2003 | Hall et al. |
| 6,677,756 | B2 | 1/2004 | Fanini et al. |
| 6,680,613 | B2 | 1/2004 | Rosthal |
| 6,688,396 | B2 | 2/2004 | Floerke et al. |
| 6,690,170 | B2 | 2/2004 | Homan et al. |
| 6,703,837 | B1 | 3/2004 | Wisler et al. |
| 6,765,385 | B2 | 7/2004 | Sinclair et al. |
| 6,768,407 | B2 | 7/2004 | Kohda et al. |
| 6,768,700 | B2 | 7/2004 | Veneruso et al. |
| 6,777,940 | B2 | 8/2004 | Macune |
| 6,810,331 | B2 | 10/2004 | Bittar et al. |
| 6,814,162 | B2 | 11/2004 | Moran et al. |
| 6,849,195 | B2 | 2/2005 | Basheer et al. |
| 6,900,640 | B2 * | 5/2005 | Fanini et al. ............... 324/339 |
| 6,913,095 | B2 | 7/2005 | Krueger |
| 6,915,701 | B1 | 7/2005 | Tarler |
| 6,975,243 | B2 | 12/2005 | Clark et al. |
| 7,031,839 | B2 | 4/2006 | Tabarovsky et al. |
| 7,038,457 | B2 * | 5/2006 | Chen et al. ............... 324/339 |
| 7,040,003 | B2 | 5/2006 | Hall et al. |
| 7,046,009 | B2 | 5/2006 | Itskovich |
| 7,057,392 | B2 | 6/2006 | Wang et al. |
| 7,064,676 | B2 | 6/2006 | Hall et al. |
| 7,091,810 | B2 | 8/2006 | Hall et al. |
| 7,095,232 | B2 | 8/2006 | Haber et al. |
| 7,098,657 | B2 | 8/2006 | Guilhamat et al. |
| 7,098,858 | B2 | 8/2006 | Bittar et al. |
| 7,116,199 | B2 | 10/2006 | Hall et al. |
| 7,138,897 | B2 | 11/2006 | Minerbo |
| 7,141,981 | B2 | 11/2006 | Folberth et al. |
| 7,150,316 | B2 | 12/2006 | Itskovich |
| 7,193,420 | B2 | 3/2007 | Chen |
| 7,212,132 | B2 | 5/2007 | Gao et al. |
| 7,265,649 | B1 | 9/2007 | Hall et al. |
| 7,301,429 | B1 | 11/2007 | Hall et al. |
| 7,360,610 | B2 | 4/2008 | Hall et al. |
| 7,598,742 | B2 | 10/2009 | Synder et al. |
| 2006/0033502 | A1 | 2/2006 | Bittar |
| 2006/0197629 | A1 | 9/2006 | Pivit et al. |
| 2006/0208383 | A1 | 9/2006 | Aisenbrey |
| 2009/0050372 | A1 | 2/2009 | Hall et al. |

* cited by examiner

DOWNHOLE INDUCTION RESISTIVITY TOOL

CROSS REFERENCE TO RELATED APPLICATIONS

This application is a continuation of U.S. patent application Ser. No. 12/341,771 filed on Dec. 22, 2008 and entitled "Resistivity Reference Receiver", which is a continuation-in-part of U.S. patent application Ser. No. 11/776,447, filed on Jul. 11, 1007 and entitled "Externally Guided and Directed Field Induction Resistivity Tool", that issued Oct. 6, 2009 as U.S. Pat. No. 7,598,742, which, in turn, claims the benefit of U.S. Provisional Patent Application No. 60/914,619, filed on Apr. 27, 2007 and entitled "Resistivity Tool".

This application is also a continuation-in-part of U.S. patent application Ser. No. 11/687,891, tiled on Mar. 19, 2007 and entitled "Multiple Frequency Inductive Resistivity Device", that issued on Nov. 27, 2007 as U.S. Pat. No. 7,301,429. This application is also a continuation-in-part of U.S. patent Ser. No. 11/676,494, filed on Feb. 19, 2007 and entitled "Flexible Inductive Resistivity Device", that issued Sep. 4, 2007 as U.S. Pat. No. 7,265,649. This application also claims the benefit of U.S. Provisional Patent Application No. 61/073,190, filed on Jun. 17, 2008 and entitled "Downhole Cover". All of the above mentioned references are herein incorporated by reference for all that they contain.

BACKGROUND OF THE INVENTION

Electric resistivity of a downhole formation is often measured from a wireline or drill string component in a well bore to analyze formation parameters. Induction resistivity tools induce a magnetic field into the formation; and thus, are different from laterolog resistivity systems, where an electric current is passed through the formation.

U.S. Pat. No. 6,677,756 to Fanini, et al, which is herein incorporated by reference for all that it contains, discloses an induction tool for formation resistivity evaluations. The tool provides electromagnetic transmitters and sensors suitable for transmitting and receiving magnetic fields in radial directions.

U.S. Pat. No. 6,359,438 to Bittar, which is herein incorporated by reference for all that it contains, discloses a resistivity tool for use in an LWD system that includes a transmitter array with multiple transmitters positioned above a pair of receivers. The transmitters are selectively energized, causing current to be induced in the collar of the tool.

U.S. Pat. No. 6,577,129 to Thompson, et al, which is herein incorporated by reference for all that it contains, discloses an electromagnetic wave propagation resistivity borehole logging system comprising multiple groups of electromagnetic transmitter-receiver arrays operating at three frequencies.

U.S. Pat. No. 6,538,447 to Bittar, which is herein incorporated by reference for all that it contains, discloses a multi mode resistivity tool for use in a logging while-drilling system that includes an asymmetric transmitter design with multiple transmitters capable of generating electromagnetic signals at multiple depths of investigation.

U.S. Pat. No. 7,141,981 to Folbert, et al, which is herein incorporated by reference for all that it contains, discloses a resistivity logging tool suitable for downhole use that includes a transmitter, and two spaced apart receivers. The measured resistivities at the two receivers are corrected based on measuring the responses of the receivers to a calibration signal.

U.S. Pat. No. 6,218,842 to Bittar, et al, which is herein incorporated by reference for all that it contains, discloses a resistivity tool for use in LWD systems that includes an asymmetric transmitter design with multiple transmitters capable of generating EM signals at multiple frequencies.

U.S. Pat. No. 5,045,795 to Gianzero, et al, which is herein incorporated by reference for all that it contains, discloses a coil array which is installed on a MWD drill collar for use in a resistivity logging system. The drill collar is provided with upper and lower coil support rings. These are toroids which support individual coil segments, and are connected by suitable magnetic shorting bars. The coil segments and shorting bars inscribe a specified solid angle or azimuthal extent.

U.S. Pat. No. 5,606,260 to Giordano, et al, which is herein incorporated by reference for all that it contains, discloses a microdevice is provided for measuring the electromagnetic characteristics of a medium in a borehole. The microdevice includes at least one emitting or transmitting coil (31), and at least one receiving coil (41,51). The microdevice generates an A.C. voltage at the terminals of the transmitting coil and measures a signal at the terminals of the receiving coil. The microdevice also includes an E-shaped electrically insulating, soft magnetic material circuit serving as a support for each of the coils and which is positioned adjacent to the medium in the borehole.

U.S. Pat. No. 6,100,696 to Sinclair, which is herein incorporated by reference for all that it contains, discloses a directional induction logging tool is provided for measurement while drilling. This tool is preferably placed in a side pocket of a drill collar, and it comprises transmitter and receiver coils and an electromagnetic reflector.

U.S. Pat. No. 6,163,155 to Bittar, et al, which is herein incorporated by reference for all that it contains, discloses a downhole method and apparatus for simultaneously determining the horizontal resistivity, vertical resistivity, and relative dip angle for anisotropic earth formations.

U.S. Pat. No. 6,476,609 to Bittar, et al, which is herein incorporated by reference for all that it contains, discloses an antenna configuration in which a transmitter antenna and a receiver antenna are oriented in nonparallel planes such that the vertical resistivity and the relative dip angle are decoupled.

BRIEF SUMMARY OF THE INVENTION

A downhole induction resistivity assembly comprises a downhole tool string component. The tool string component comprises an induction transmitter. The transmitter is adapted to induce an induction field in the surrounding formation. A first induction receiver is spaced apart from the transmitter and is adapted to measure the induction field. A magnetic field generating mechanism is disposed adjacent on either or both sides of the transmitter and adapted to guide the transmitter's signal into the formation. A second induction receiver is disposed in close proximity to the magnetic field generating mechanism and is adapted to measure the magnetic field generated by the mechanism.

The magnetic field generating mechanism generates an augmented magnetic field. The mechanism generates a directed magnetic field. Some embodiments of either the magnetic field generating mechanism or the induction transmitter may comprise: a Halbach array, a substantially U-shaped magnetic core, at least one coil disposed circumferentially about the tool (wherein a magnetically conductive, electrically insulating material is disposed adjacent a surface of the component and the coil), or some other magnetic field inducing mechanism.

The transmitter and/or at least one of the receivers may comprise a magnetic core disposed substantially parallel with an axis of the tool string component. The transmitter and/or at least one of the receivers may also comprise a plurality of circumferentially spaced units that are independently excitable. The units may also be tilted with respect to the central axis. The input and/or outputs from the units may be multiplexed.

One of the receivers may comprise a core that is positioned substantially perpendicular to another induction resistivity receiver. The transmitter may be adapted to generate the induction field at a different phase, frequency, and/or amplitude than the mechanism is adapted to generate the magnetic field. The resistivity assembly may comprise a control-loop adapted to execute a command to the mechanism to adjust a characteristic of the magnetic field, such characteristics being selected from the group consisting of phases, amplitudes, frequencies, strength, or combinations thereof. The transceiver and/or at least one of the receivers may comprise litz wire.

DETAILED DESCRIPTION OF THE INVENTION AND THE PREFERRED EMBODIMENT

Figure 1:
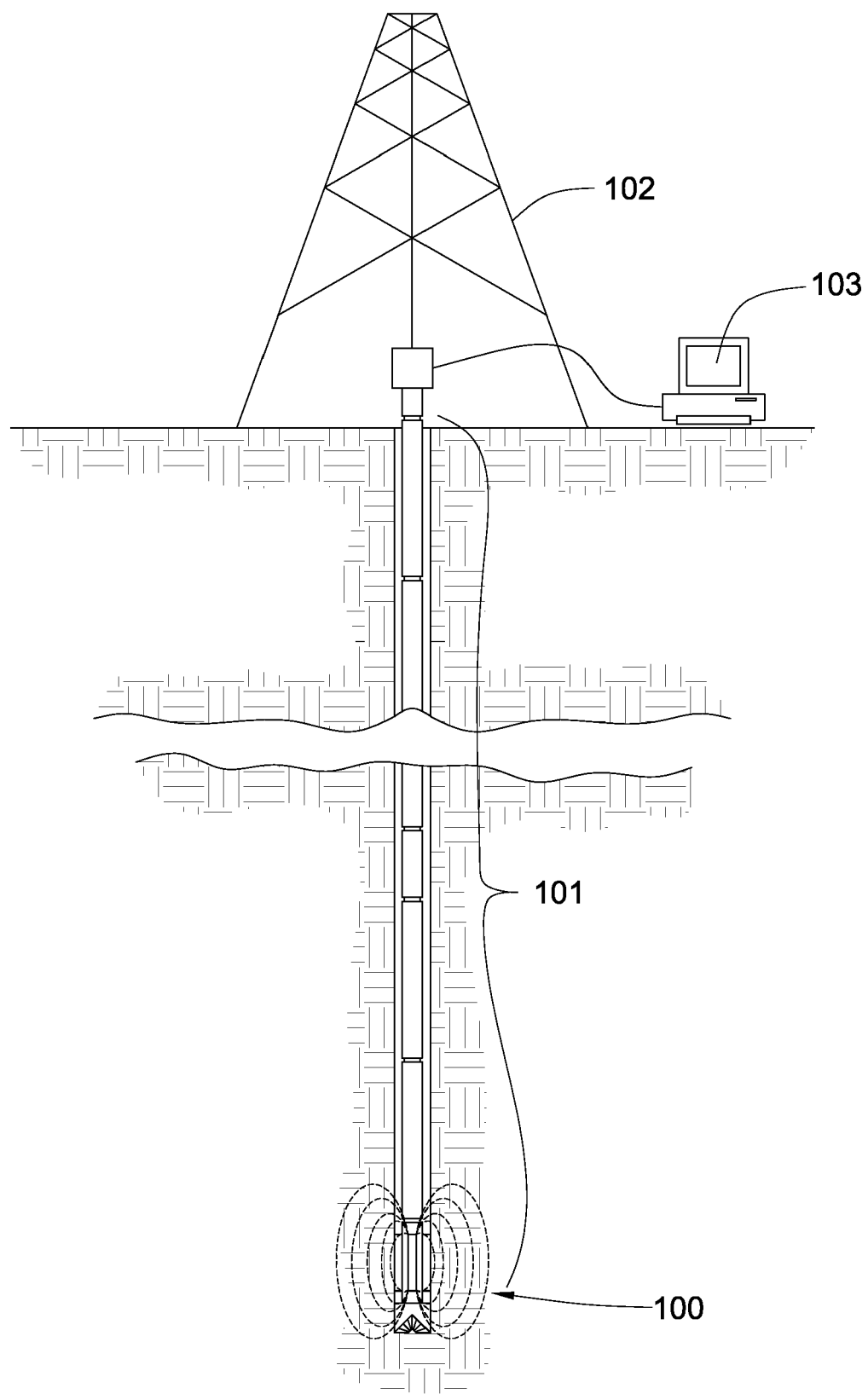
FIG. 1 is a cross-sectional diagram of an embodiment of a downhole tool string.

Referring now to FIG. 1, a downhole tool string 101 may be suspended by a derrick 102. The tool string may comprise one or more downhole components 100, linked together in a tool string 101 and in communication with surface equipment 103 through a downhole network. Networks in the tool string 101 may enable high-speed communication between devices connected to the tool string, and the networks may facilitate the transmission of data between sensors and sources. The data gathered by the downhole components 100 may be processed downhole, may be transmitted to the surface for processing, may be filtered downhole and then transmitted to the surface for processing or may be compressed downhole and then transmitted to the surface for processing.

Figure 2:
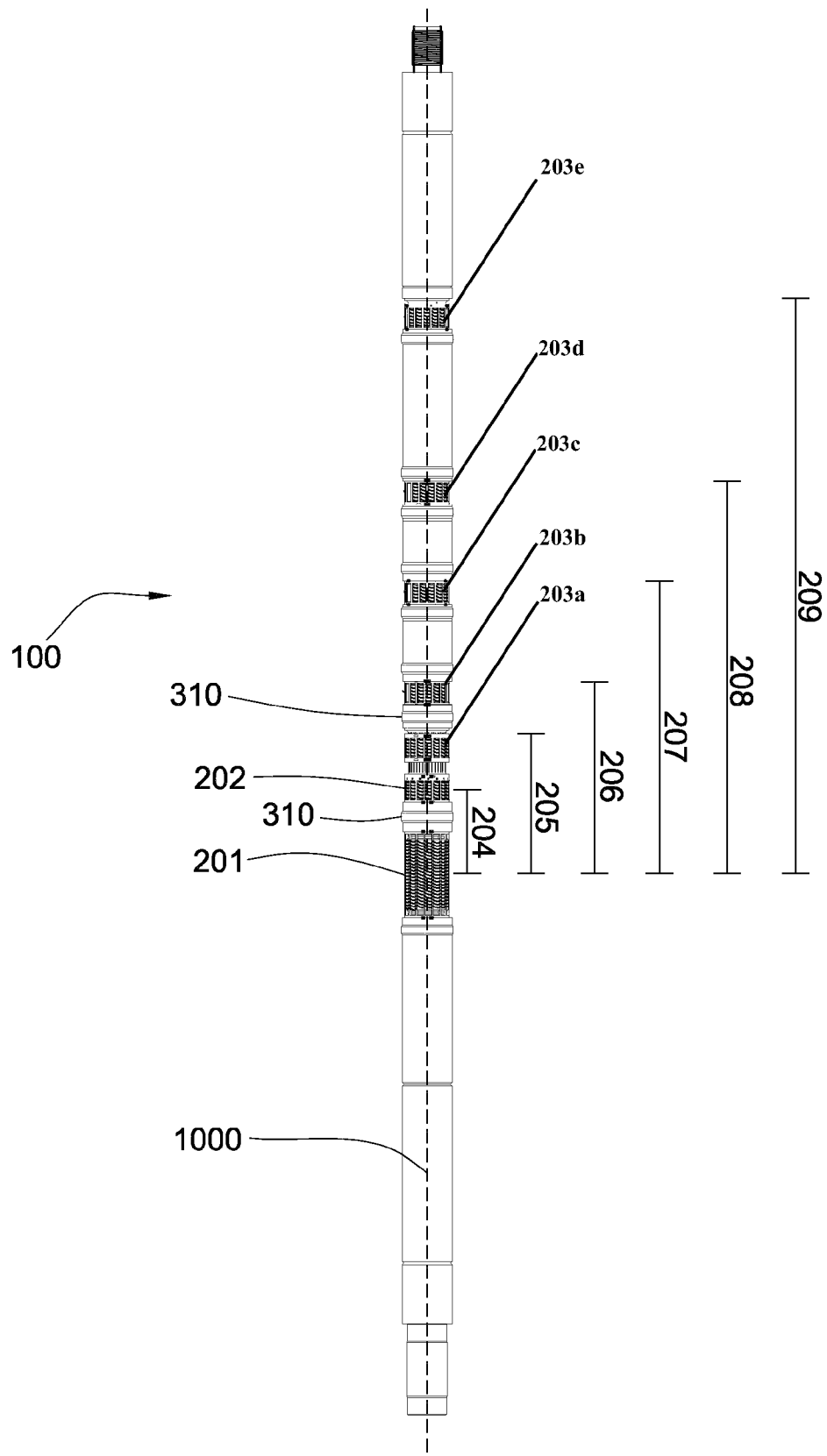
FIG. 2 is a perspective diagram of an embodiment of tool string component.

FIG. 2 is an embodiment of a tool string component 100. The tool string component may comprise an induction transmitter 201 and a plurality of induction receivers 203a-e. The receivers 203a-e may be placed in a variety of orientations with respect to each other and to the transmitter 201. The induction transmitter 201 is adapted to send an induction signal in to the formation, which generates a formation induction field surrounding the well bore. The induction receivers 203a-e are adapted to sense various attributes of the induction field in the formation These attributes may include among others, some or all of the following: frequency, amplitude, or phase. The transmitter and the receivers may be powered by batteries, a turbine generator or from the downhole network. The receivers may also be passive. In some embodiments, there may be several induction transmitters located along the length of the tool string component. In some embodiments, the additional transmitters may be used to calibrate measurements, such as in common in borehole compensation techniques.

The transmitter 201 and receivers 203a-e may communicate with the network through a multiplexer 310. The reference receiver 202 and receivers 203a-e may be spaced along a central axis 1000 of the component 100 from the transmitter such that: a first reference receiver 202 is spaced a distance 204 that is 10 to 14 inches from the center of the transmitter 201, a first receiver 203a is spaced a distance 205 that is 16 to 20 inches from the center of the transmitter 201, a second receiver 203b is spaced a distance 206 that is 23 to 28 inches from the center of the transmitter 201, a third receiver 203c is spaced a distance 207 that is 38 to 43 inches from the center of the transmitter 201, a fourth receiver 203d is spaced a distance 208 that is 52 to 57 inches from the center of the transmitter 201, and a fifth receiver 203e is spaced a distance 209 that is 77 to 82 inches from the center of the transmitter 201.

Figure 3A:
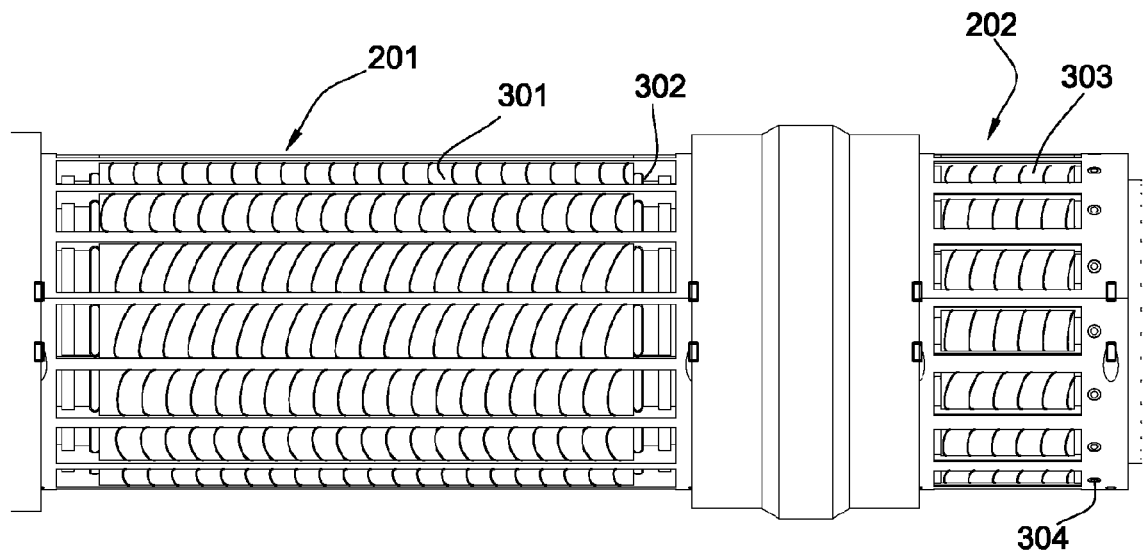
FIG. 3a is a perspective diagram of an embodiment of an induction transmitter.
Figure 3B:
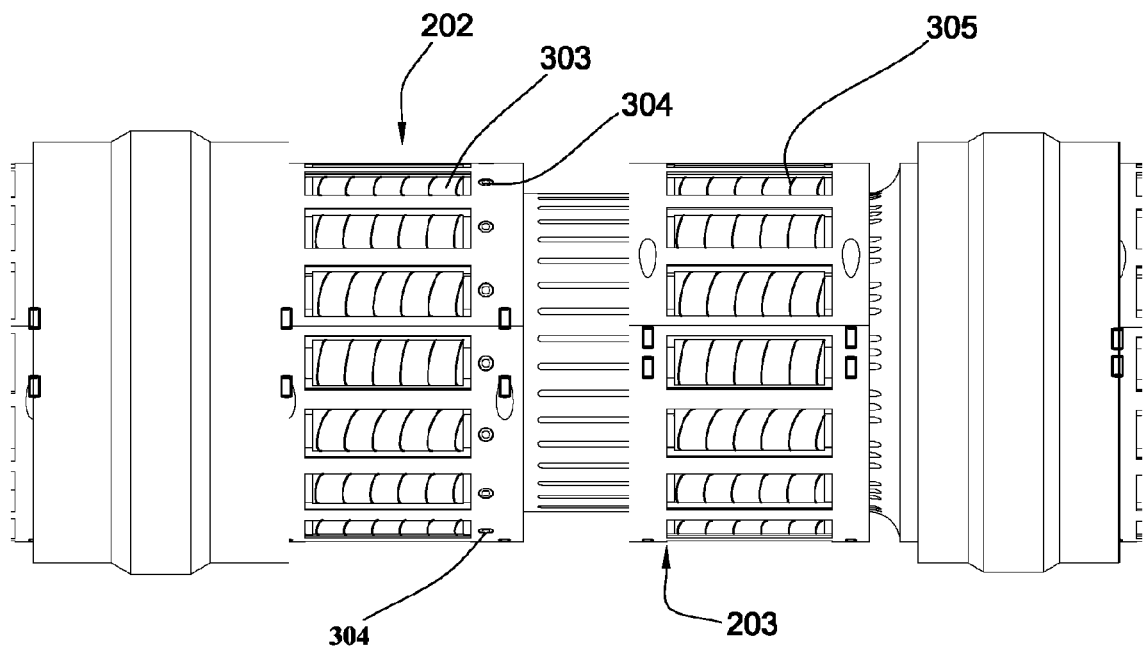
FIG. 3b is a perspective diagram of an embodiment of an induction receiver.

FIG. 3a is a perspective view of an embodiment of a transmitter 201 disposed within a drill string component and FIG. 3b is a perspective view of an embodiment of three receivers 202, 203, and 304. The transmitter 201 may comprise an array of transmitter units 301 spaced circumferentially around the tool string 100. The transmitter units 301 may lie parallel to the body of the drill string. The transmitter units 301 may be independently excitable. Independently excitable units may focus the induction field in only a portion of the formation adjacent to the excitable units while the remaining portion of the formation is minimally affected or not affected at all. Furthermore it is believed that the ability to concentrate the field in portions of the formation adjacent the well bore will allow for directional measurements of the formation. Data received through directional measurement may verify a current drilling trajectory or it may reveal needed adjustments. Steering adjustments may be made by a steering system in communication with a downhole communication system, such as the system disclosed in U.S. Pat. No. 6,670,880, which is herein incorporated by reference for all that it discloses. An embodiment of a compatible steering system is disclosed in U.S. patent application Ser. No. 12/262,372 to Hall et al., which is herein incorporated by reference for all that it contains.

The transmitter 201 may also comprise a magnetic field generating mechanism 302, which may guide the induction field produced by the transmitter units 301 by forcing the transmitter's signal deeper into the formation The windings on the transmitter 201 may be in a different direction then the windings on the magnetic field generating mechanism 302. In some embodiments, the magnetic field generating mechanism 302 may generate an augmented field or a directed field. Examples of magnetic field generating mechanism that may be used to influence the signal from the transmitter include Hallbach arrays, electric magnets, and directed magnetic field. Without the magnetic field generating mechanism 302 the transmitter's signal may travel along the path of lest resistance which could be within a shallower region of the formation or even along the surface of the tool string component. The magnetic field generating mechanism 302 may generate a magnetic field that will repel the signal away from the tool string component, and thus, deeper into the formation. The magnetic field generating mechanism 302 may have a startup sequence such that when the transmitter 201 first starts a reference receiver 202 measures the field strength and through a control loop adjusts the output of the magnetic field generating mechanism 302 until the field measured by the reference receiver 202 is at a desired strength. The magnetic field generating mechanisms 302 may also have units that are independently excitable with respect to phase, frequency, or magnitude.

The reference receiver 202 may be disposed in the tool string component in close proximity to the magnetic field generating mechanism 302. The reference receiver 202 is close enough to the magnetic field generating mechanism 302 that it is excitable by the magnetic field generating mechanism 302, not just the induction field that is regenerated in the formation. The other receivers 203 may be less sensitive to the induction field generated by the magnetic field generating mechanism 302. Thus, the reference receiver 202 may determine the strength, magnitude, phase, and other parameters of the signal generated by the magnetic field generating mechanism 302. If the magnetic field generating mechanism 302 produces a magnetic field that is too weak the magnetic field may be ineffective, and if the magnetic field is too strong it may inhibit the transmitter's 201 induction field from penetrating the formation at all. Such parameters may be used to adjust the magnetic field generating mechanism 302 to produce an optimal signal for the desired penetration of the induction field into the formation. The resistivity tool may comprise a control loop that is adapted to execute a command to adjust at least one parameter of the magnetic field generating mechanism 302; the characteristics may be selected from the group consisting of phases, amplitudes, frequencies, strength, or combinations thereof. In some embodiments the telemetry system may include mud pulse, EM, short-hop, and/or wired pipe, the command to adjust the signal may be from surface equipment or generated downhole. In some embodiments, the signal is executed automatically or it may be executed manually.

In some embodiments, the reference receiver 202 may be capable of sensing both the magnetic field and the induction field. In such cases, the signals from the transmitter 201 and the magnetic field generating mechanism 302 may comprise different parameters such as different frequencies, different phases, different amplitude, and/or signal strength so that the signals may be distinguishable. In some embodiment, the other receivers 203 may also be close enough to sense the magnetic field.

The reference receiver 202 may be comprised of an array of reference receiver units 303. The reference receiver units 303 may lie substantially parallel to a longitudinal axis of the body of the tool string component. The reference receiver 202 may comprise a spool receiver 304 that may comprise a magnetically conductive core that is disposed perpendicular to the body of the drill string and another induction resistivity receiver. The spool receiver 304 may be part of a reference receiver assembly. Since the core of the spool receiver 304 and the reference receiver units 303 lie on different planes they sense boundaries of the subterranean formation that the other cannot. In some embodiments, the reference receiver units 303 and the core of the spool receiver 304 are oriented such that they are not substantially perpendicular to each other, but are still adapted to sense boundary between subterranean strata at different angles.

Figure 4A:
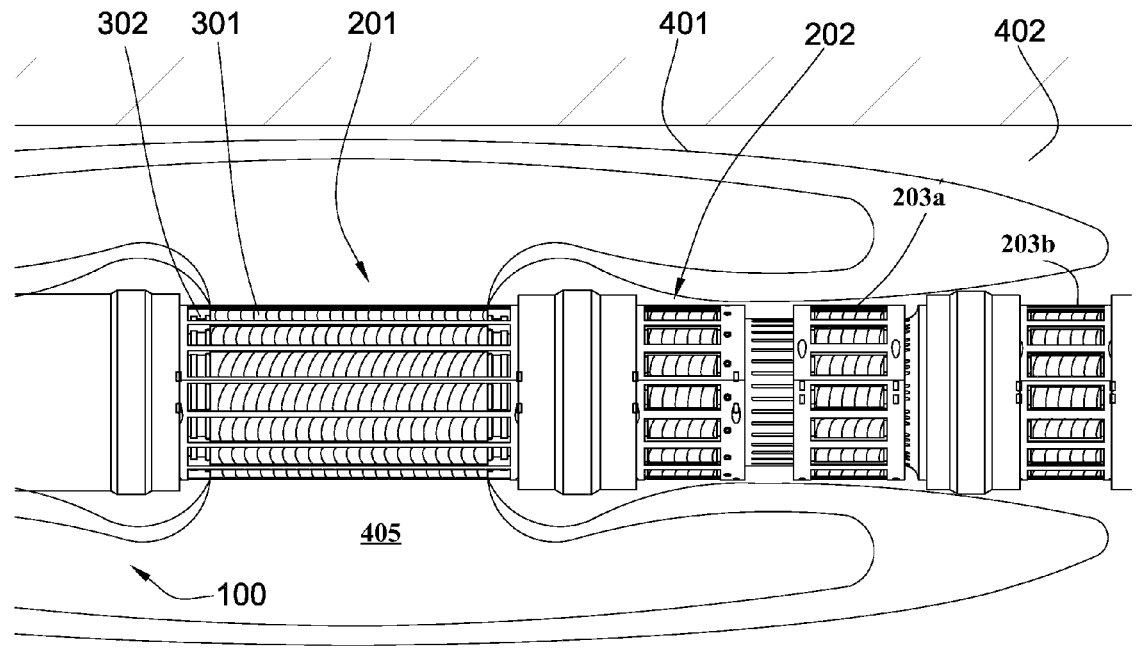
FIG. 4a is a perspective diagram of an embodiment of an induction resistivity assembly disposed downhole.
Figure 4B:
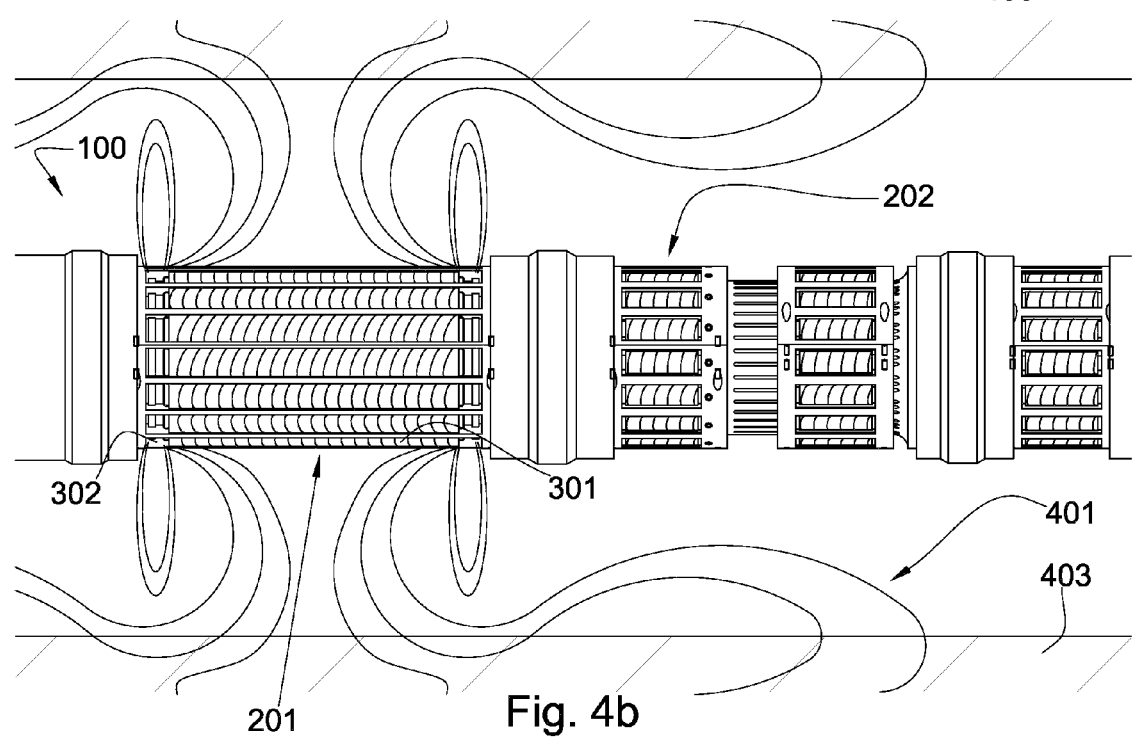
FIG. 4b is a perspective diagram of another embodiment of an induction resistivity assembly disposed downhole.

Referring now to FIG. 4a, an embodiment of a tool string component is depicted in a borehole 405. The drill string component 100 comprises a transmitter 201, a reference receiver 202, and receivers 203. The transmitter 201 is depicted generating an induction signal 401 with the magnetic field generating mechanism 302 being inactive. Drilling mud 402 is disposed between the tool string component and the formation 403. The magnetic field 401 may tend to predominately travel within the borehole 405 or within a shallow portion of the formation infiltrated by drilling mud and may not penetrate deeply into the formation 403. This may prevent an actual depiction of the formation surrounding the bore hole. FIG. 4b depicts an embodiment of a tool string component with both the transmitter unit 301 and the magnetic field generating mechanism 302 activated, which shows the induction signal traveling deeper in the formation. It is believed that by adjusting the output of the magnetic field generating mechanism 302 the penetration depth of the induction signal 401 may be adjusted. The magnetic field generating mechanisms 302 may be positioned on both sides of the transmitter 201.

Figure 5A:
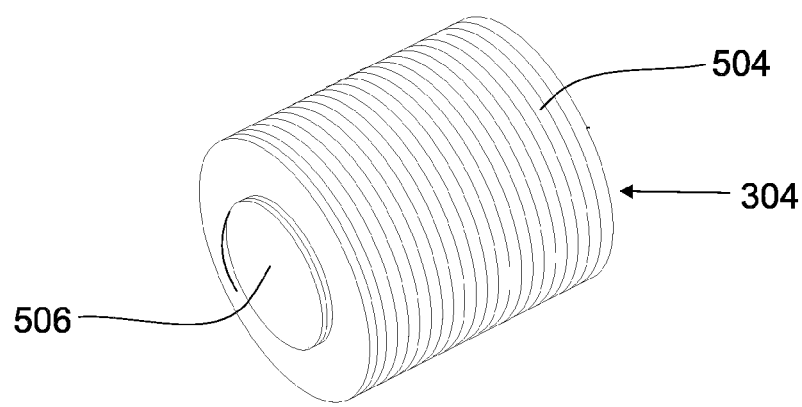
FIG. 5a is a perspective diagram of another embodiment of an induction receiver.
Figure 5B:
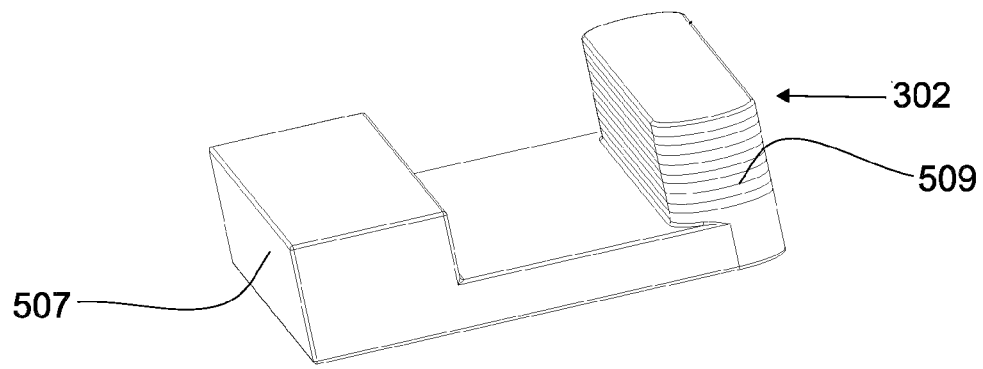
FIG. 5b is perspective diagram of another embodiment of an induction transmitter.
Figure 5C:
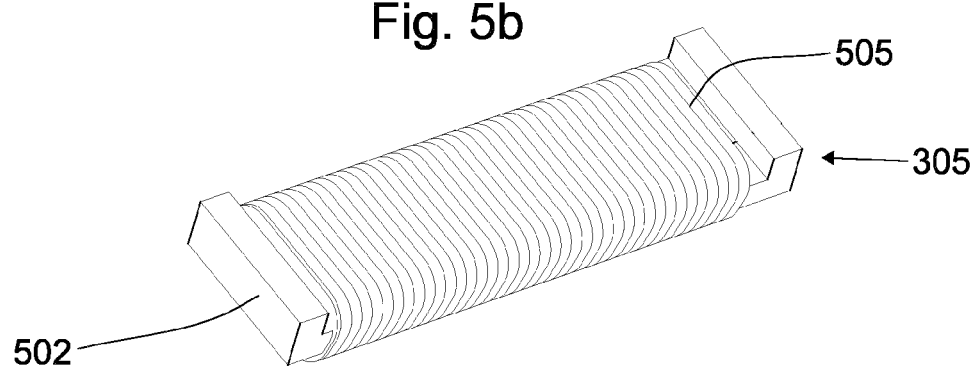
FIG. 5c is a perspective diagram of another embodiment of an induction receiver.
Figure 5D:
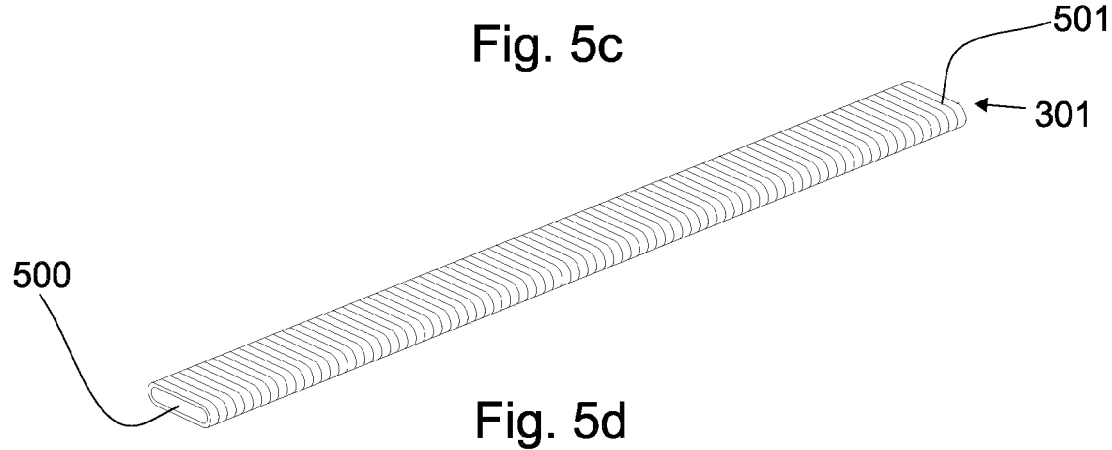
FIG. 5d is a perspective diagram of another embodiment of an induction transmitter.

FIG. 5a discloses an embodiment of a spool receiver 304. The spool receiver 304 may comprise a ferrite core 506 wrapped in wire 504. FIG. 5b discloses an embodiment of a magnetic field generating mechanism 302. The magnetic field generating mechanism 302 may comprise a U-shaped ferrite core 507 wrapped in wire 509. FIG. 5c discloses an embodiment an independently excitable unit of a receiver unit 305 and/or transmitter with a ferrite core 502 wrapped in wire 505. FIG. 5d discloses an embodiment of a transmitter unit 301 and/or receiver. The transmitter unit 301 may comprise a ferrite core 500 wrapped in wire 501. In some embodiments, the wire 501. 505, 509 depicted in FIGS. 5a-d may be Litz wire. In some embodiments, the wire windings on the various components may be wrapped in different directions or different patterns then each other.

Figure 6A:
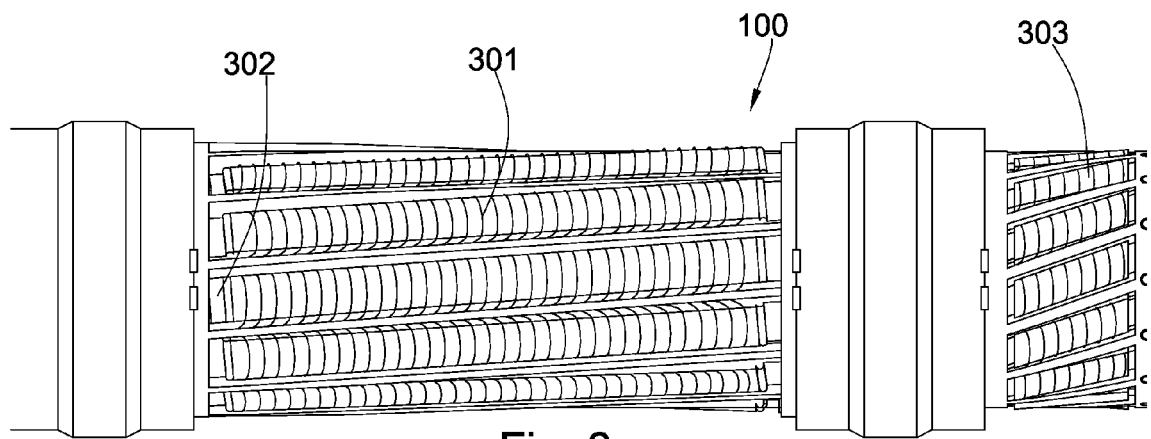
FIG. 6a is a perspective diagram of another embodiment of an induction transmitter.
Figure 6B:
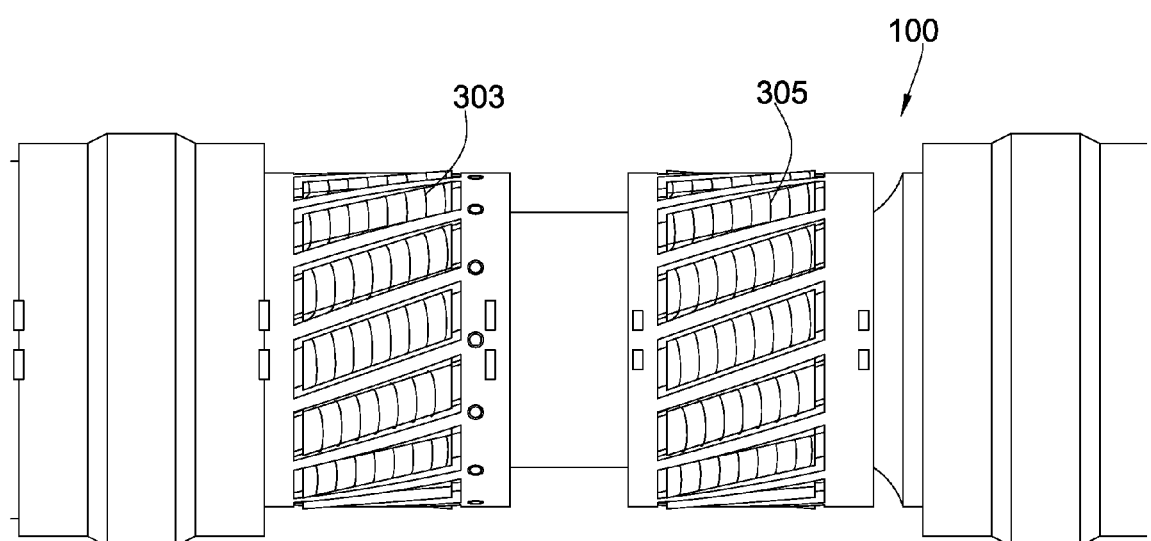
FIG. 6b is a perspective diagram of another embodiment of an induction receiver.

FIG. 6a depicts an embodiment of a portion of a tool string component 100. In this embodiment the transmitter units 301 and the magnetic field generating mechanisms 302 are tilted with respect to a central axis of the tool string 100. In FIG. 6b an embodiment of a portion of a tool string component 100 discloses the reference receiver units 303 and the receiver units 305 tilted with respect to a central axis of a tool string component. The tilt angle may be at any degree. In some embodiments, the tilt angle is between 10 and 50 degrees with respect to the central axis.

Figure 7A:
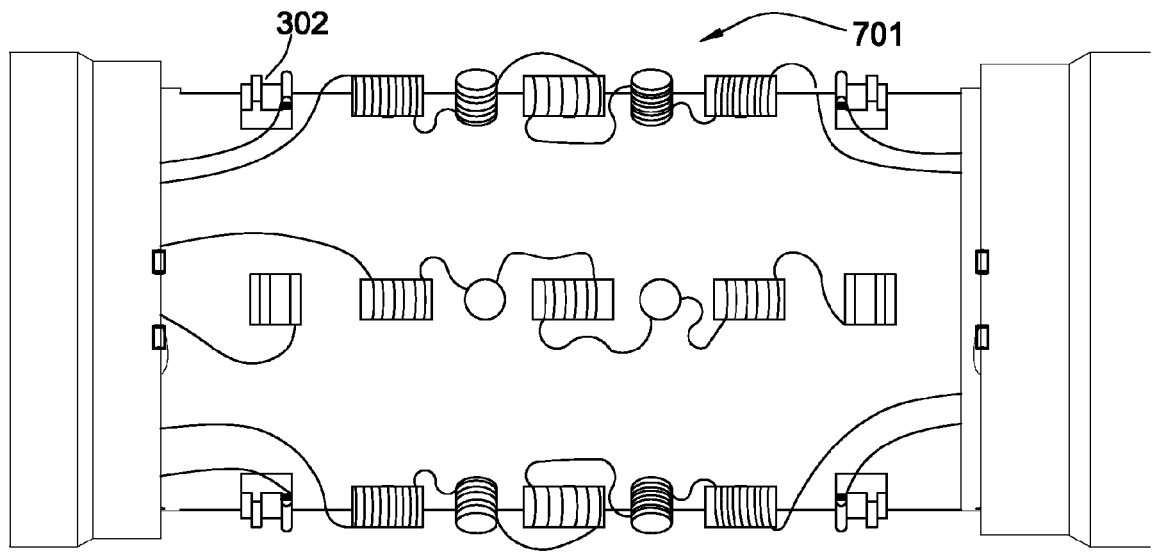
FIG. 7a is a perspective diagram of another embodiment of an induction transmitter.
Figure 7B:
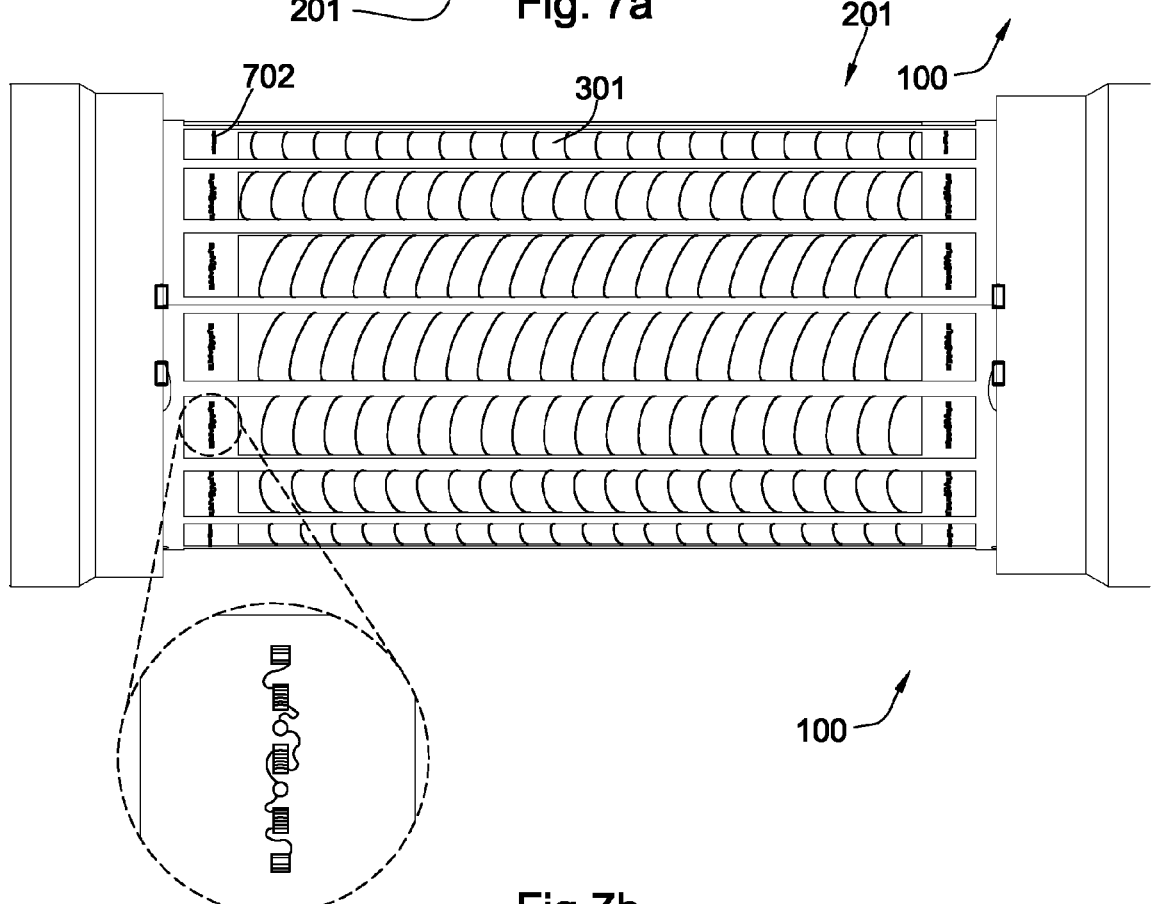
FIG. 7b is a perspective diagram of another embodiment of an induction transmitter.

FIG. 7a is an embodiment of a transmitter 201 disposed on a tool string component 100. In this embodiment the transmitter units 701 comprises a Halbach array. FIG. 7b is an embodiment of a transmitter 201 disposed on a tool string component 100. In this embodiment the magnetic field generating mechanism 702 comprises a Halbach array. It is believed that the Halbach array will direct a greater magnitude of the magnetic field for a given power into the formation then a standard transmitter.

Figure 8A:
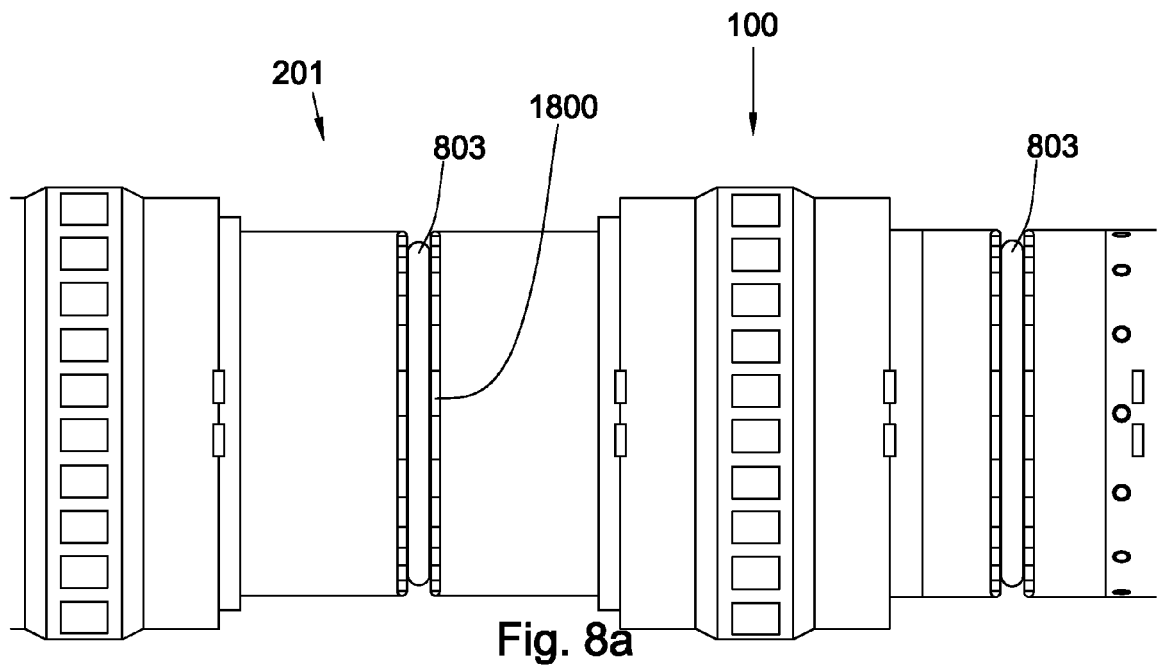
FIG. 8a is a perspective diagram of another embodiment of an induction transmitter.

FIG. 8a depicts an embodiment of a transmitter 201 where the transmitter comprises wire windings 803 wound circumferentially around the tool string component 100. The wire is disposed within a trough of magnetically conductive, electrically insulating (MCEI) material 1800 that is disposed adjacent a surface of the component and the coil. The MCEI material may comprise mu-metals, ferrite, and/or iron. An embodiment of a transmitter that may be compatible with the present invention is disclosed in U.S. patent application Ser. No. 11/676,494, which is herein incorporated by reference for all that it discloses.

Figure 8B:
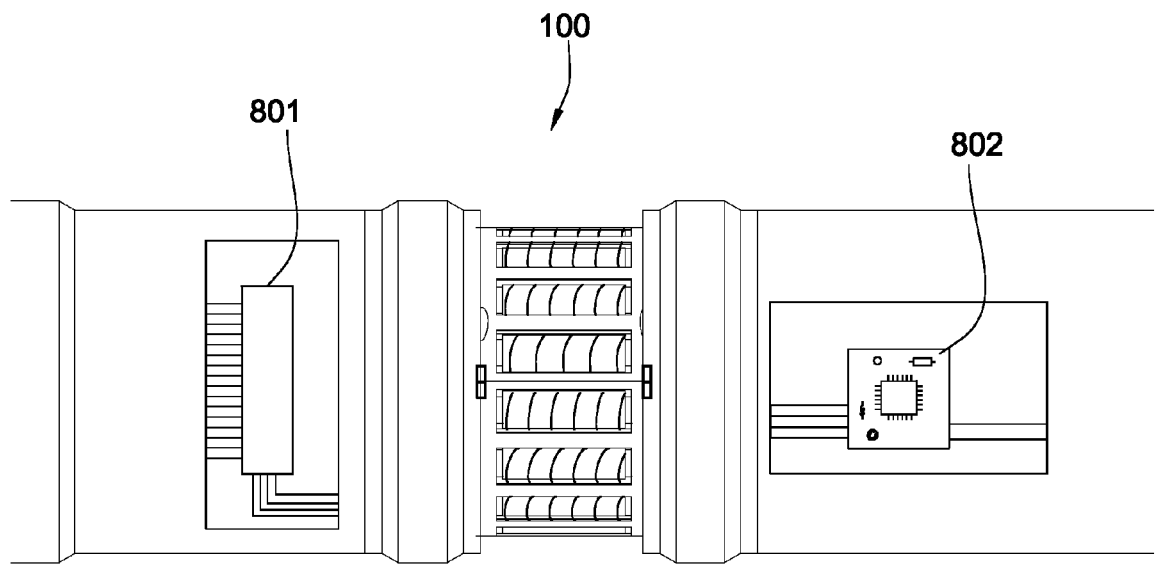
FIG. 8b is a diagram of an embodiment of electronic assemblies disposed within a downhole component.

FIG. 8b discloses an embodiment of a portion of a tool string component 100. The tool string 100 may comprise a multiplexer 801. The multiplexer may be adapted to take data from multiple inputs and put all of the data onto a lesser number of outputs. The tool string component may also comprise a processing element 802. The processing element 802 may be adapted to process data and send out commands to the tool string 100. That data may comprise among other data any or all of the following: data from the receivers, data from the reference receiver, or data from the transmitter. The processing element 802 may send commands to a steering assembly to guide the tool string 100 in a desired direction.

Figure 9:
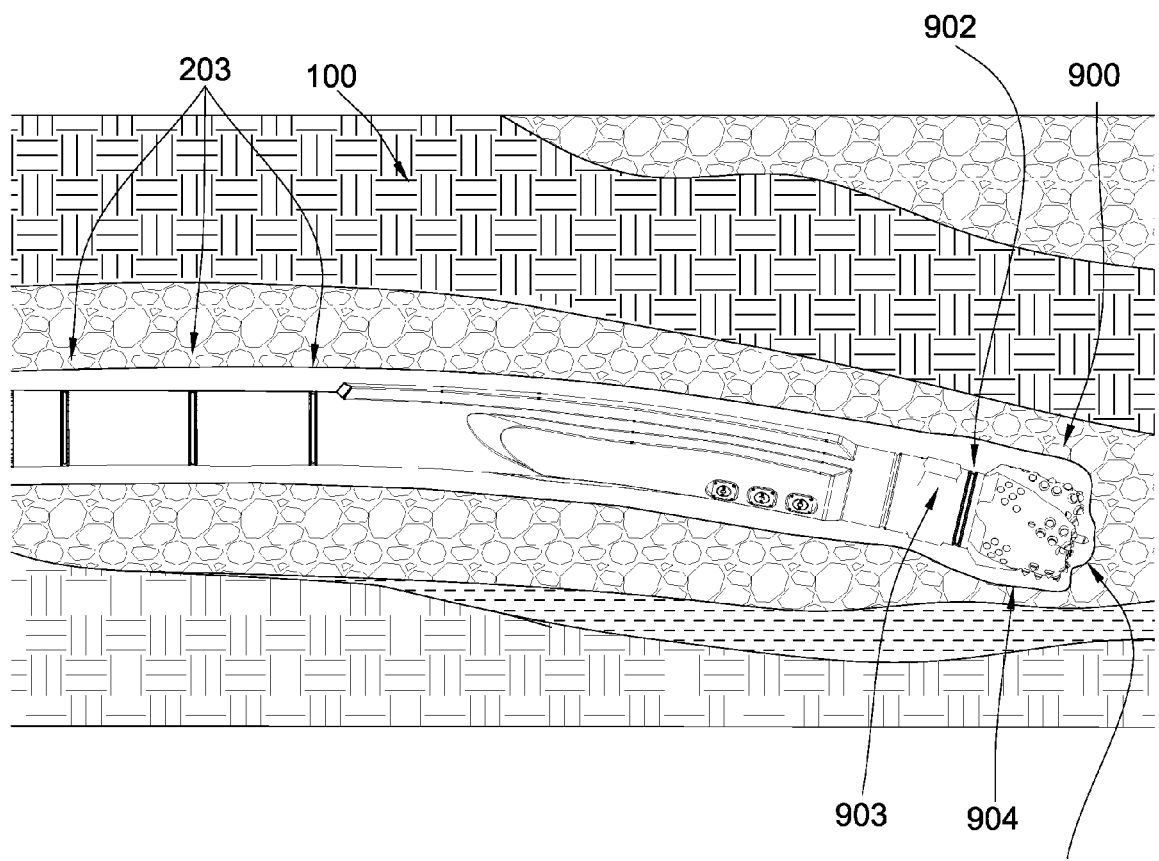
FIG. 9 is a perspective diagram of a downhole tool string component.
Figures 10A, 10B:
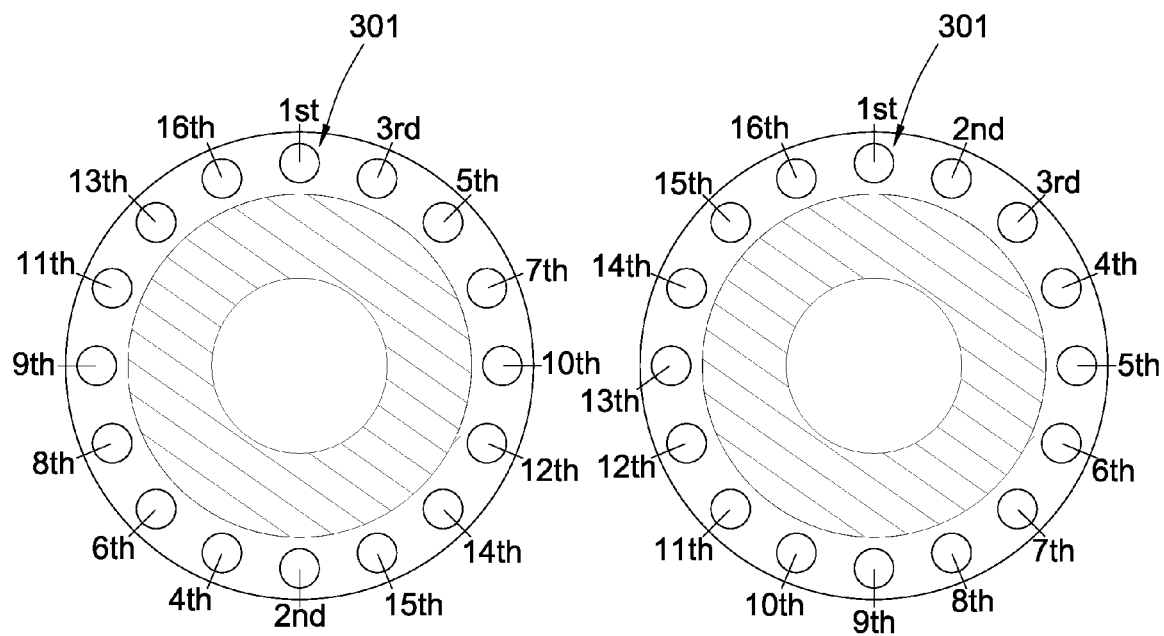
FIG. 10a is a cross sectional diagram of a downhole tool string component.
FIG. 10b is a cross sectional diagram of a downhole tool string component.
Figures 10C, 10D:
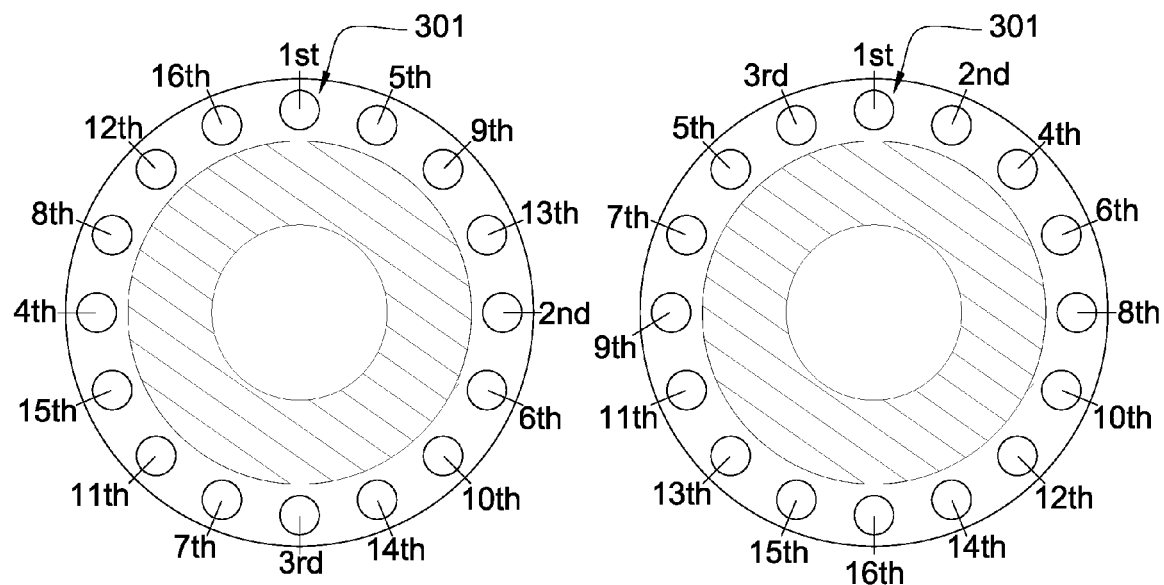
FIG. 10c is a cross sectional diagram of a downhole tool string component.
FIG. 10d is a cross sectional diagram of a downhole tool string component.

FIG. 9 is a perspective diagram of a downhole tool string component 100 in operation downhole. The tool string component 100 is connected to a drill bit 900 comprising a steering mechanism 901 protruding beyond the front face of the bit. Also shown are a plurality of receivers 203 disposed along the tool string component and the drill bit. The receivers may be positioned on different downhole components or they may be positioned along a single downhole component. The farthest most receiver 902 from the transmitter may be disposed on the drill bit and positioned between the wrench flats 903 of the drill bit and the drill bit's cutting blades 904. The resistivity tool may be used for geo-steering applications where it is desirable to stay within a specific formation layer. The resistivity tool may help identify the formation type boundaries. In embodiments where the resistivity tool is connected to a feed back loop, a command may be sent from a processing element associated with the resistivity tool to a steering system to adjust the tool string's trajectory to keep the tool string within the preferred layer. In some embodiments, data from the resistivity tool may be received up-hole through a telemetry system and adjustments to the steering may be executed remotely. Data may be gathered from any of the sensors while the drill bit is rotating, while the drill bit is sliding, or while the drill bit is stationary. A rotary steerable system that may be compatible with the present invention is disclosed in U.S. Pat. No. 7,360,610, which is herein incorporated by reference for all that it discloses.

FIGS. 10a, 10b, 10c, and 10d are cross sectional views of a downhole component depicting the individually excitable induction units 301. In some embodiments, these units 301 may be excited at once, in pairs, in groups, or individually. In some applications it may be desirable to analyze only a portion of the borehole wall. In some applications, where accuracy is critical, the drill string may be stopped, and the units may be individually activated. In other embodiments, a single unit may be activated while the drill string rotates, and thus, induces an induction field around the entire circumference of the bore hole. The transmitter units 301 may be activated in a number of different orders. The activation orders may include but are not limited to the orders depicted in FIGS. 10a, 10b, 10c, and 10d. The transmitter segments 301 may be activated in a clockwise or counter clockwise direction.

Figure 11A:
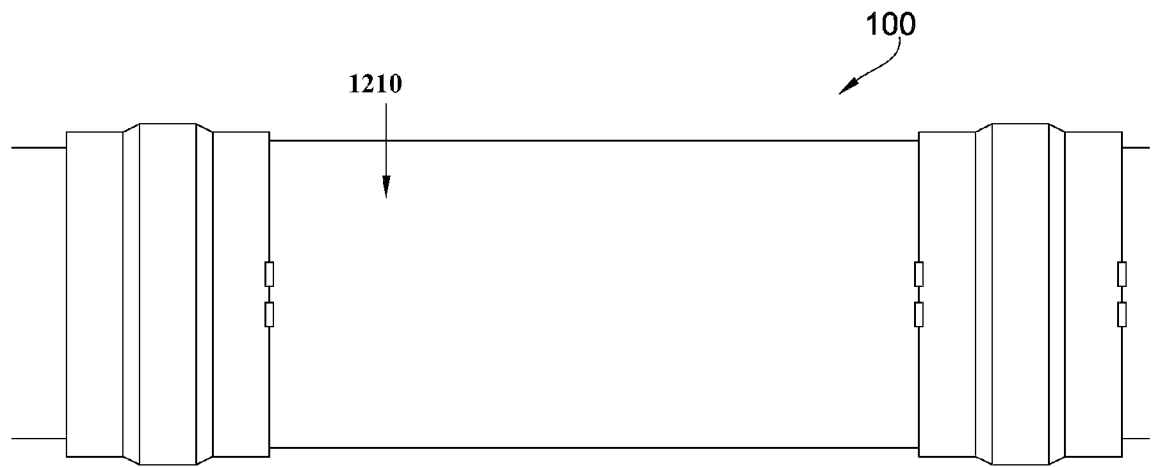
FIG. 11a is a perspective diagram of a downhole tool string component.

FIG. 11a depicts an embodiment of an irradiated plastic cover 1210 disposed around a tool string component 100. It is believed that the irradiated plastic cover 1210 may protect the transmitters and receivers. It is also believed the cover 1210 will minimally interfere with the induction waves. The cover 1210 may comprise a material selected from a group of thermoplastic polymers. The cover may comprise a polytheretherkekytone (PEEK) material In some embodiments, the plastic may comprise glass filled PEEK, glass filled Torlon®, Torlon®, polyamide-imide, glass filled polyamide-imide, thermoplastic, polyimides, polyamides or combinations thereof. The cover material may have a melting point between 333.9 degrees Celsius and 350 degrees Celsius. The cover material may have a tensile strength of between 70 megapascals and 100 megapascals. The cover may take the form of a sleeve disposed around the tool string component. The cover may also comprise irradiated plastic windows 1202 configured to cover the individual transmitter units 1201 or individual receiver units 1203, 1205, as shown in FIG. 11b.

Figure 11B:
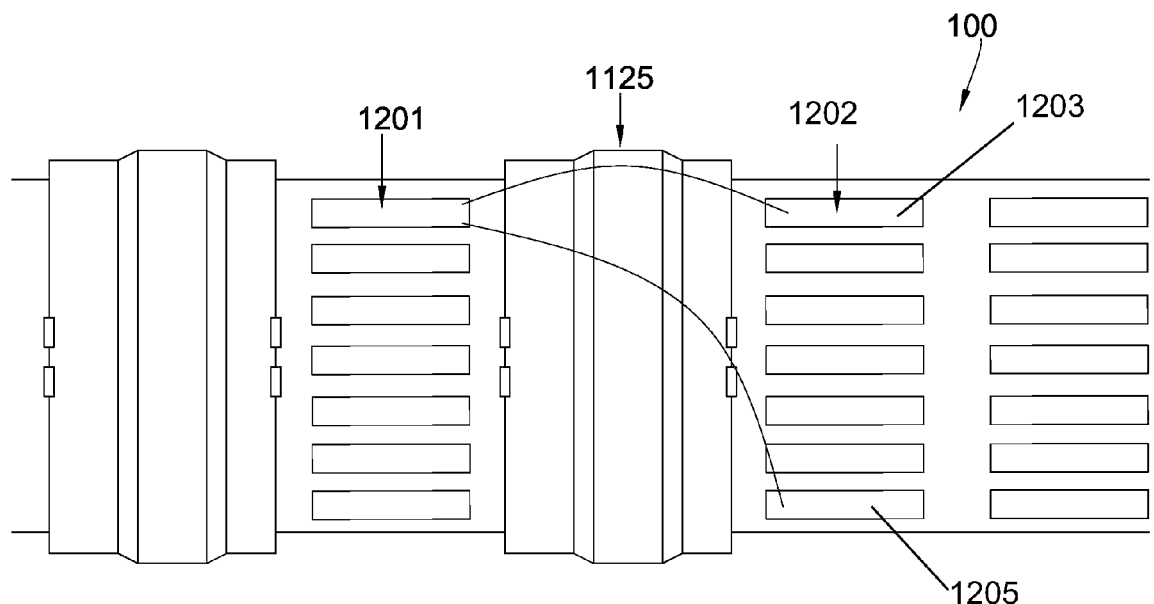
FIG. 11b is a perspective diagram of a downhole tool string component.

FIG. 11b depicts an embodiment of a data gathering technique. In this technique a single transmitter unit 1201 is activated and the generated signal 1125 is gathered by an individual receiver unit 1203. The receiver unit 1203 that is used to gather the signal 1125 may be at the same azimuth as the activated transmitter unit 1201. The non-data gathering receiver segments may be deactivated or ignored. This process is repeated with a different set of receivers and transmitters. In some applications, a portion or all of the transmitters and receivers may be used. Data received at a receiver unit 1205 on a different azimuth that the transmitter unit 1201 may provide angular data that may correspond to a dip angle 1150 (see FIG. 12b) of a formation.

Figure 12A:
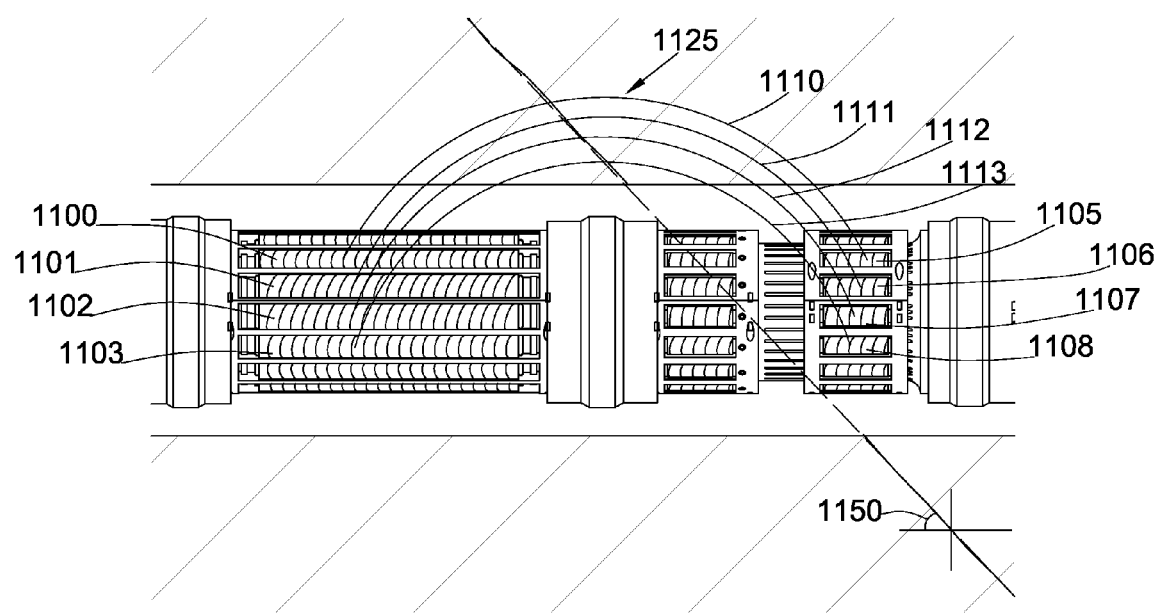
FIG. 12a is a perspective diagram of a downhole tool string component.
Figure 12B:
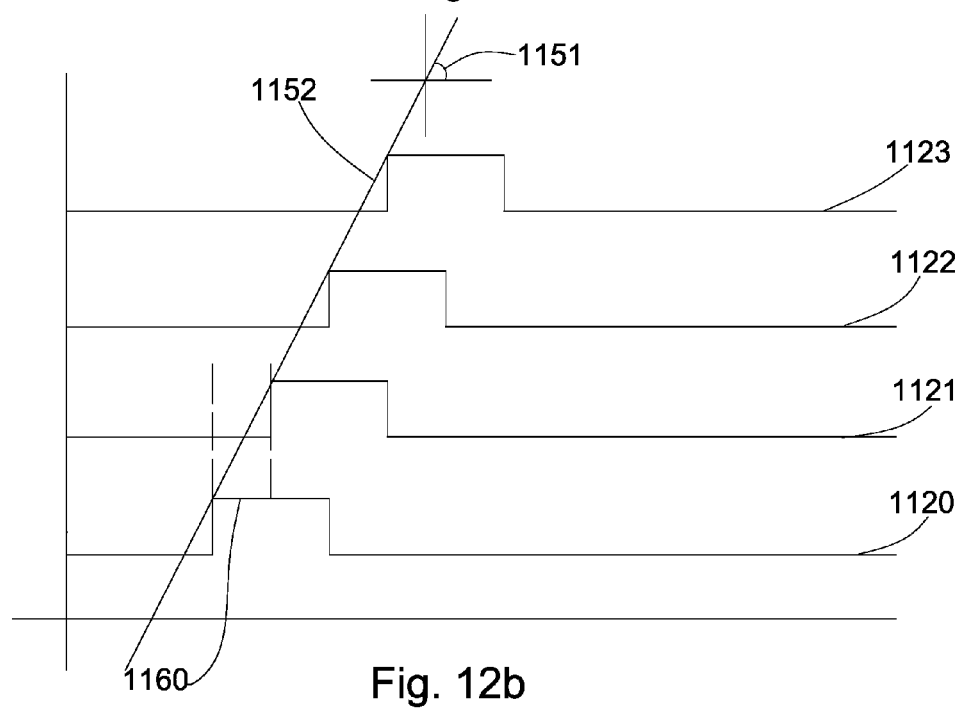
FIG. 12b is a plot of an embodiment of data gathered from a downhole tool string component.

In FIG. 12a, the transmitter unit 1100 generates signal 1110 which is received by receiver unit 1105, then transmitter unit 1101 generates signal 1111 which is received by receiver unit 1106, then transmitter segment 1102 generates signal 1112 which is received by receiver unit 1107, and finally transmitter unit 1103 generates signal 1113 which is received by receiver unit 1108. An embodiment of the gathered data is plotted in FIG. 12b. The plots may correspond to the gathered data such that plot 1123 corresponds to signal 1110, plot 1122 corresponds to signal 1111, plot 1121 corresponds to signal 1112, and plot 1120 corresponds to signal 1113. The plots may be versus either time or frequency. It is believed that the plots will have an offset 1160 with respect to each other. It is believed that the offset 1160 of each consecutive recorded signal 1125 may be extrapolated to form a line 1152 of a certain slope. It is further believed that this line 1152 will form an angle 1151 that is mathematically related to the dip angle 1150 of the formation. In FIG. 12b, only a portion of the extrapolated line is shown, which if fully represented would appear as a sine wave than a straight line.

Figure 13:
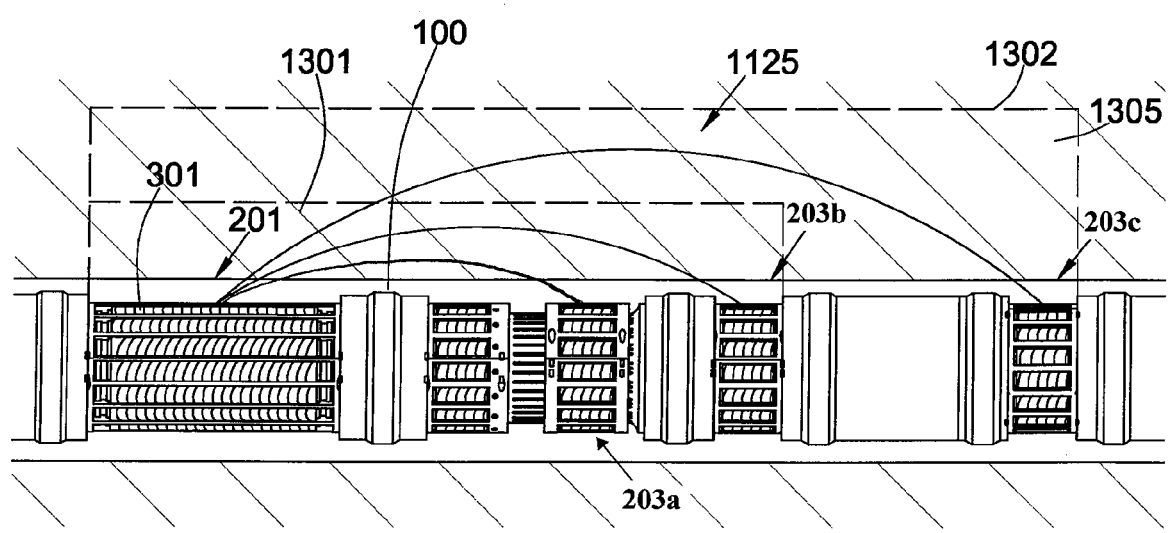
FIG. 13 is a perspective diagram of a downhole tool string component.

FIG. 13 depicts another embodiment of a data gathering technique. In this technique a transmitter unit 301 is activated and a first receiver 203a and a second receiver 203b capture the data. The data received from the first receiver 203a contains information that corresponds to the formation 1301 that is adjacent to the tool string component 100 between the transmitter 201 and the first receiver 203a. The data received from the second receiver 203bcontains information that corresponds to the formation 1302 that is adjacent to the tool string component 100 between the transmitter 201 and the second receiver 203b. This data gathering technique utilizes mathematical operations to extract the information that corresponds to the formation 1305 lying predominately adjacent to the tool string 100 between the first receiver 203a and the second receiver 203b.

Figure 14A:
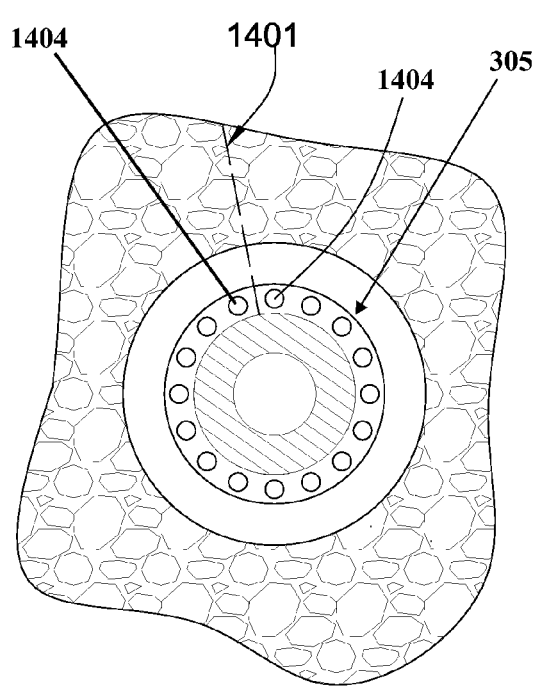
FIG. 14a is a cross sectional diagram of a downhole tool string component.
Figure 14B:
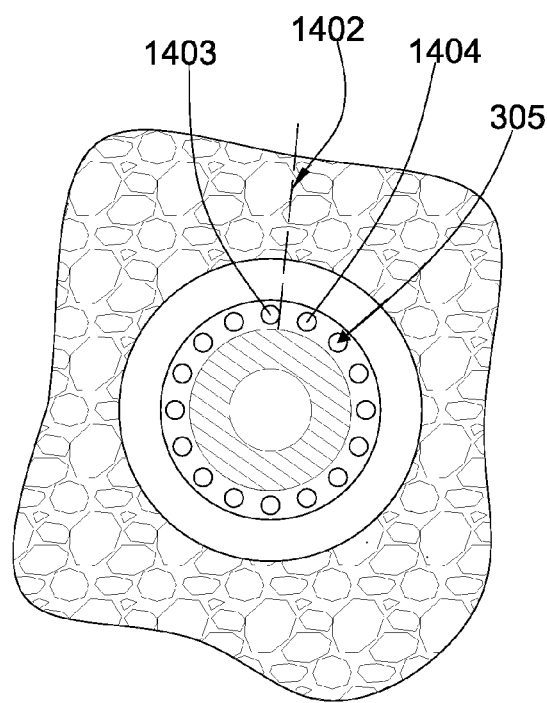
FIG. 14b is a cross sectional diagram of a downhole tool string component.

FIGS. 14a and 14b depict different embodiments of receiver units 305. For example, the receiver units 1403 and 1404 may be independently excitable. The receiver units 1403 and 1404 may be electronically deactivatable. The receiver units 1403 and 1404 may also be tunable such that a virtual receiver unit 1401 is created. A virtual receiver unit 1401 may be created when two adjacent receiver units 1403 and 1404 adjust their power such that a virtual receiver 1401 can be modeled as be positioned between the two receiver units 1403 and 1404. FIG. 14a depicts an embodiment of a virtual receiver unit 1401 that is the result of the data received by two adjacent receivers units 1403 and 1404 being equally weighted. FIG. 14b depicts an embodiment of a virtual receiver unit 1402 that is the result of the data received by receiver unit 1403 being weighed more heavily then the data received by receiver unit 1404. The virtual receiver unit 1402 in this case appears closer to receiver unit 1403 than in FIG. 14a.

Whereas the present invention has been described in particular relation to the drawings attached hereto, it should be understood that other and further modifications apart from those shown or suggested herein, may be made within the scope and spirit of the present invention.

What is claimed is:

1. A downhole induction resistivity assembly, comprising:
   a component configured to be conveyed into a wellbore, said component including:
      at least one transmitter, adapted to generate an induction signal and transmit said induction signal into a formation adjacent said wellbore;
      at least one receiver being spaced apart from said transmitter, said receiver adapted to receive a formation signal representative of said formation;
      a magnetic field generating mechanism adapted to generate a magnetic field, said magnetic field adapted to influence said induction signal: and,
      a magnetically conductive, electrically insulating material disposed adjacent a surface of said component and said at least one transmitter.

2. The assembly of claim 1, further comprising a reference receiver adapted to measure a magnetic field signal representative of said magnetic field.

3. The assembly of claim 2, wherein said at least one transmitter generates said induction signal having at least one of a phase, a frequency, and an amplitude different than at least one of a phase, a frequency, and an amplitude of said magnetic field generated by said magnetic field generating mechanism.

4. The assembly of claim 2, further comprising a control loop adapted to receive said magnetic field signal from said reference receiver, said control loop adapted to execute a command to said magnetic field generating mechanism, to adjust said magnetic field.

5. The assembly of claim 4, wherein said command to said magnetic field generating mechanism adjusts at least one of a phases, an amplitudes, a frequency, a strength, and combinations thereof of said magnetic field.

6. The assembly of claim 1, wherein said magnetic field generating mechanism comprises a Halbach array.

7. The assembly of claim 1, wherein said magnetic field is directed away from said assembly.

8. The assembly of claim 1, wherein said magnetic field generating mechanism comprises a substantially U-shaped magnetic core.

9. The assembly of claim 1, wherein said transmitter comprises at least one coil disposed circumferentially about said component.

10. The assembly of claim 1, wherein said at least one transmitter further comprises a plurality of transmitter units adapted to be independently energized.

11. The assembly of claim 10, further comprising a multiplexer adapted to receive data input from at least one of said transmitter, said receiver, and said reference receiver.

12. The assembly of claim 1, further comprises a plurality of receivers in which a first receiver includes a core substantially perpendicular to another core of a second receiver.

13. The assembly of claim 1, wherein said at least one receiver includes a magnetic material having a different magnetic property than another magnetic material of said at least one transmitter.

14. A logging tool, comprising:
   a component configured to be conveyed into a wellbore, said component including:
      at least one transmitter, adapted to generate an induction signal and transmit said induction signal into a formation adjacent said wellbore;
      at least one receiver being spaced apart from said transmitter, said receiver adapted to receive a formation signal representative of said formation;
      a magnetic field generating mechanism adapted to generate a magnetic field, said magnetic field adapted to influence said induction signal; and,
      a reference receiver adapted to measure a magnetic field signal representative of said magnetic field.

15. The logging tool of claim 14, further comprising a magnetically conductive, electrically insulating material disposed adjacent a surface of said component and said transmitter.

16. The logging tool of claim 15, further comprising a control loop adapted to receive said magnetic field signal from said reference receiver, said control loop adapted to execute a command to said magnetic field generating mechanism to adjust said magnetic field.

17. The logging tool of claim 14, wherein said at least one transmitter generates said induction signal having at least one of a phase, a frequency, and an amplitude different than at least one of a phase, a frequency, and an amplitude of said magnetic field generated by said magnetic field generating mechanism.

18. A logging tool, comprising:

a component configured to be conveyed into a wellbore, said component including:

at least one transmitter, adapted to generate an induction signal and transmit said induction signal into a formation adjacent said wellbore;

at least one receiver being spaced apart from said transmitter, said receiver adapted to receive a formation signal representative of said formation;

a magnetic field generating mechanism adapted to generate a magnetic field, said magnetic field adapted to influence said induction signal; and, wherein said at least one transmitter generates said induction signal having at least one of a phase, a frequency, and an amplitude different than at least one of a phase, a frequency, and an amplitude of said magnetic field generated by said magnetic field generating mechanism.

19. The logging tool of claim 18, further comprising a magnetically conductive, electrically insulating material disposed adjacent a surface of said component and said transmitter.

20. The logging tool of claim 18, further comprising a reference receiver adapted to measure a magnetic field signal representative of said magnetic field.

21. The logging tool of claim 20, further comprising a control loop adapted to receive said magnetic field signal from said reference receiver, said control loop adapted to execute a command to said magnetic field generating mechanism to adjust said magnetic field.

22. The logging tool of claim 18, wherein said at least one transmitter generates said induction signal having at least one of a phase, a frequency, and an amplitude different than at least one of a phase, a frequency, and an amplitude of said magnetic field generated by said magnetic field generating mechanism.

* * * * *